No. 685,756. Patented Nov. 5, 1901.
C. H. GIFFORD.
VELOCIPEDE.
(Application filed Sept. 1, 1900.)
(No Model.)
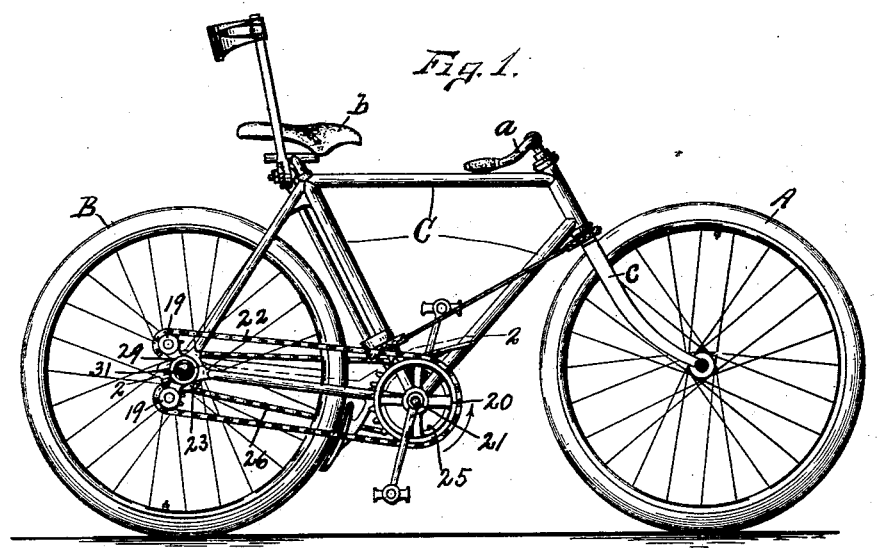
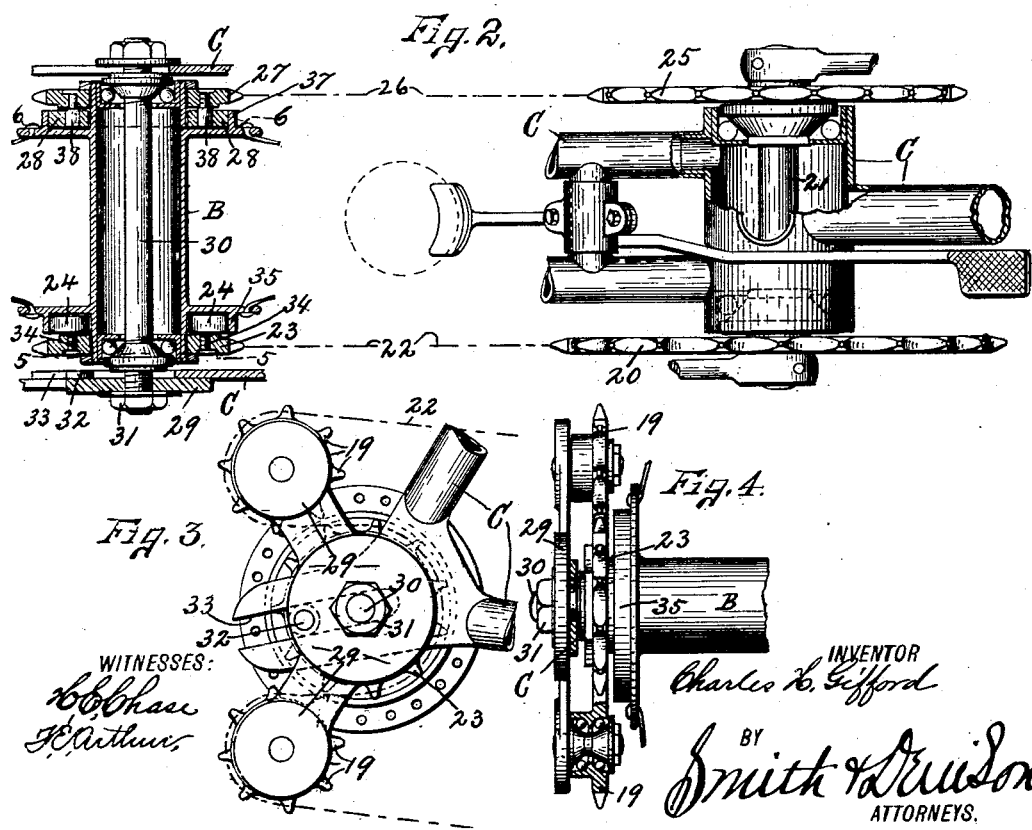
WITNESSES:
INVENTOR
Charles H. Gifford
BY
Smith & Denison
ATTORNEYS.

UNITED STATES PATENT OFFICE.

CHARLES H. GIFFORD, OF SYRACUSE, NEW YORK.

VELOCIPEDE.

SPECIFICATION forming part of Letters Patent No. 685,756, dated November 5, 1901.

Application filed September 1, 1900. Serial No. 28,770. (No model.)

*To all whom it may concern:*

Be it known that I, CHARLES H. GIFFORD, of Syracuse, in the county of Onondaga, in the State of New York, have invented new and useful Improvements in Velocipedes, of which the following, taken in connection with the accompanying drawings, is a full, clear, and exact description.

This invention relates to improvements in velocipedes, and particularly to bicycles, and has for its object the production of a simple and practical mechanism for propelling the bicycle or other velocipede forwardly by forward or rearward rotation of the driving member and for producing a differential speed of the driven member by such forward or rearward rotation of the driving member.

To this end the invention consists in the combination and arrangement of the component parts of a bicycle or other velocipede, as hereinafter fully described, and pointed out in the claims.

Referring to the drawings, Figure 1 is an elevation of a bicycle embodying my invention. Fig. 2 is an enlarged sectional view taken on line 2 2 of Fig. 1. Fig. 3 is an enlarged end view of the hub of the rear wheel, the adjacent portions of the rear fork, and the sprocket-idlers secured thereto. Fig. 4 is a front face view, partly in section, of the parts seen in Fig. 3.

A, B, and C represent, respectively, the front and rear wheels and the supporting-frame of an ordinary bicycle, which is provided with the usual handle-bars *a* and seat *b*, all of which parts may be of any desired form, size, or construction.

In the propulsion of bicycles and similar velocipedes by means of crank-arms or pedals it is desirable to have the load upon the pedals as nearly directly under the weight of the rider as possible, and for this purpose I preferably employ one or more idlers 19, arranged in proximity to the hub of the driven member, in which case the driving member is rotated rearwardly for propelling the bicycle or other velocipede forwardly. In the drawings I have shown this driving member as consisting of an ordinary sprocket-wheel 20, mounted on a suitable crank-shaft 21 and connected by a chain 22 to a sprocket-wheel 23, loosely connected to the hub of the driven member B by clutch members 24, hereinafter described. The idlers 19 preferably consist of sprocket-wheels, which are arranged on opposite sides and a little at the rear of the sprocket-wheel 23, and the chain 22 is passed over the rear faces of said idlers and engages the front face of the sprocket-wheel 23. The opposite end of the crank-shaft 21 is also provided with a sprocket-wheel 25, preferably of less diameter than the sprocket-wheel 20, and is connected by a chain 26 to a similar sprocket-wheel 27, which is loosely connected to the opposite end of the hub of the driven member B by one or more clutch members 28, also presently described.

The idlers 19 are usually mounted on the diverging arms of a plate 29, which is secured to a stationary axle 30, mounted on the frame C for supporting the driven member B, said plate being preferably arranged at the outside of the adjacent portion of the frame and held in its position by a clamping-nut 31 and a pin 32, adapted to engage the opposite walls of a slot 33 in the rear ends of the fork sides.

The clutch members 24, previously mentioned, are eccentrically journaled upon studs 34, secured to the sprocket-wheel 23, are normally held in engagement with a flange 35, provided on the hub of the driven member B by suitable springs 36, and are adapted to lock the driven member to the sprocket-wheel 23 as said sprocket-wheel is rotated forwardly by the rearward rotation of the driving member 20. These eccentrics or cam-clutch members are so relatively arranged to the flange 35 and sprocket-wheel 23 that when the crank-shaft 21 and driving member 20 are rotated forwardly said clutch members are rotated away from the flange 35, and were it not for the sprocket-wheel 25 and its connection to the hub of the driven member B the sprocket-wheels 20 and 23 might be rotated without effecting the movement of the driven member.

The clutch members 28 at the opposite end of the hub of the driven member are similar to the clutch members 24 and are adapted to engage a flange 37, formed on the adjacent end of the hub of the driven member, when the crank-shaft 21 and the sprocket-wheels 20 and 25 are rotated forwardly. These clutch members 28 are eccentrically journaled on studs 38, secured to the sprocket-wheel 27, and are movable with said sprocket-wheel for driving or releasing the hub of the driven member, it being understood that the rearward movement of the crank-shaft and the sprocket-wheels 25 and 27, connected thereto, releases the clutch members 28 from engagement with the flange 37.

It will be readily understood from the above description that when the crank-shaft is rotated rearwardly the clutch members 24 are forced into engagement with the flange 35 for locking the driven member thereto and propelling the wheel forwardly and that when it is desired to rotate the pedals forwardly the clutch member 28 is forced into engagement with the flange 37 and also locks said driven member to the sprocket-wheel 27. The eccentrics 24 and 28 being inclined in the same direction, it is apparent that when the driving member is held from rotary movement during the forward movement of the bicycle or other velocipede the driven member is free to rotate for coasting or for any other desired purpose.

As previously stated, the sprocket-wheels 20 and 25, provided on the crank-shaft 21, are formed of unequal diameter, and the sprockets 23 and 27 are formed of substantially the same diameter. It is therefore apparent that when the crank-shaft is rotated in one direction the vehicle will be propelled at a certain rate of speed and when rotated in the reverse direction it will be propelled at a different speed.

In the drawings I have shown the driving-wheel 20 as of greater diameter than the sprocket-wheel 25. Therefore when the crank-shaft is rotated rearwardly a greater speed will be developed than when said shaft is rotated forwardly.

The operation of my invention will now be readily understood upon reference to the foregoing description and the accompanying drawings, and it will be noted that considerable change may be made in the detail construction and arrangement of the various parts of my invention without departing from the spirit thereof. Therefore I do not limit myself to the precise construction and arrangement shown and described.

Having thus fully described my invention, what I claim, and desire to secure by Letters Patent, is—

1. A velocipede comprising a driving-shaft provided with a sprocket-wheel, a revoluble driven member, a sprocket-wheel movable independently of the driven member and having its axis substantially coincident with the axis of the said driven member, an idler, a chain connecting the sprockets and idler and actuated by the rearward rotation of the driving-sprocket for rotating the driven sprocket forwardly, and a clutch member actuated by the forward movement of the driven sprocket for locking the driven member thereto.

2. A velocipede comprising a driving-shaft provided with a sprocket-wheel, a revoluble driven member, a sprocket-wheel movable independently of the driven member and having its axis substantially coincident with the axis of the said driven member, an idler, a chain connecting the sprockets and idler and actuated by the rearward rotation of the driving-sprocket for rotating the driven sprocket forwardly, and a clutch member actuated by the forward movement of the driven sprocket for locking the driven member thereto and for permitting said driven member to rotate forwardly independently of the sprockets.

3. A velocipede comprising a driving-shaft having oppositely-arranged sprockets, a driven member consisting of the hub of a wheel, oppositely-arranged sprockets movable independently of the driven member and having their axes coincident with the axis of the driven member, connections actuated by the rearward rotation of one of the sprockets of the driving-shaft for rotating the corresponding sprocket of the driven member forwardly, and an additional connection actuated by the forward movement of the other sprocket of the driving-shaft for transmitting forward rotary movement to the other sprocket of the driven member, and clutch members actuated by the forward movement of the driven sprockets for locking the driven member thereto.

4. A velocipede comprising a driving-shaft having oppositely-arranged sprockets, a driven member consisting of the hub of a wheel, oppositely-arranged sprockets movable independently of the driven member and having their axes coincident with the axis of the driven member, connections actuated by the rearward rotation of one of the sprockets of the driving-shaft for rotating the corresponding sprocket of the driven member forwardly, and an additional connection actuated for the forward movement of the other sprocket of the driving-shaft for transmitting forward rotary movement to the other sprocket of the driven member, and clutch members actuated by the forward movement of the driven sprockets for locking the driven member thereto, and for permitting the forward rotation of the driven member independently of said sprockets.

In witness whereof I have hereunto set my hand this 30th day of August, 1900.

CHARLES H. GIFFORD.

Witnesses:
H. E. CHASE,
MILDRED M. NOTT.